UNITED STATES PATENT OFFICE.

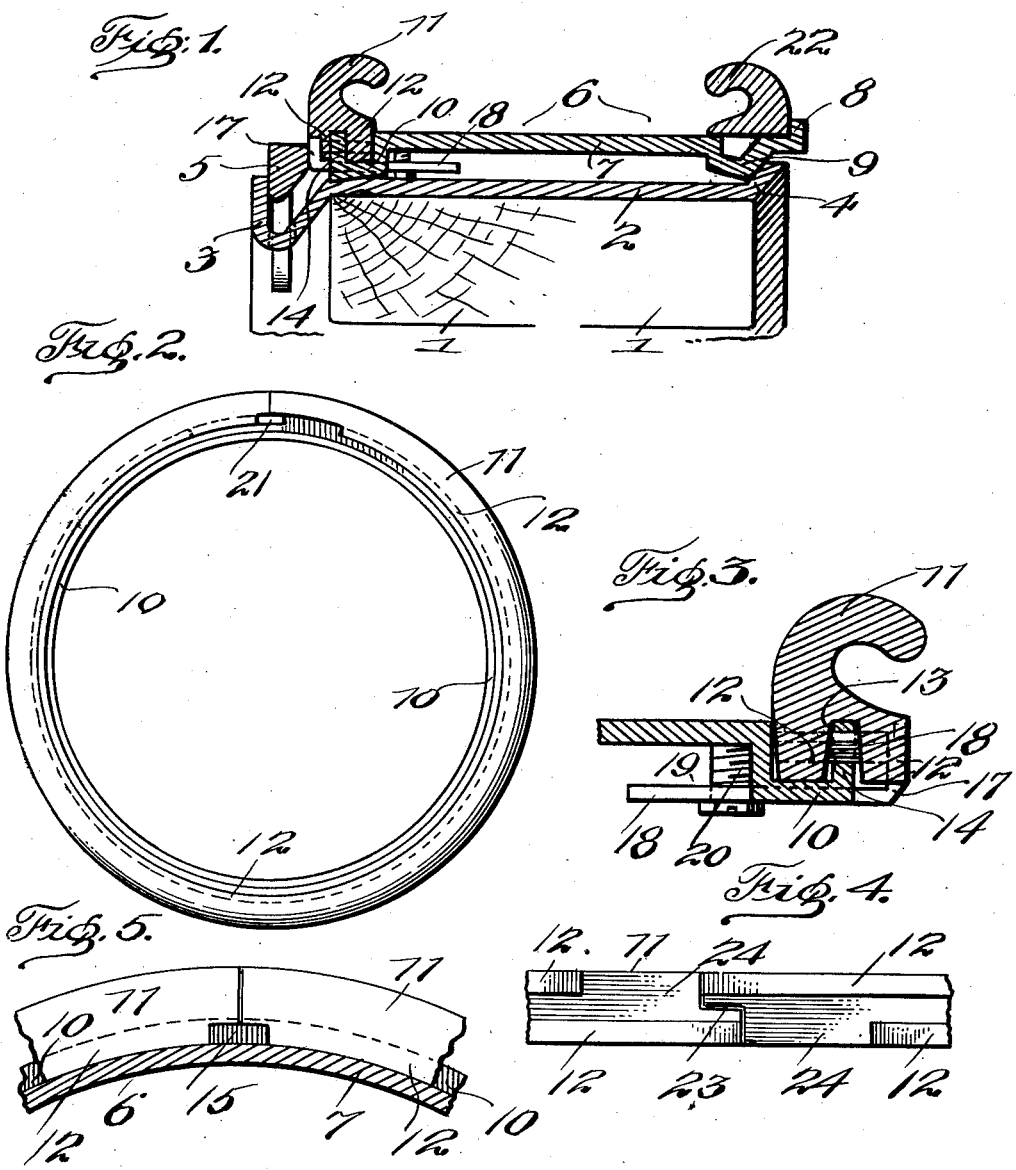

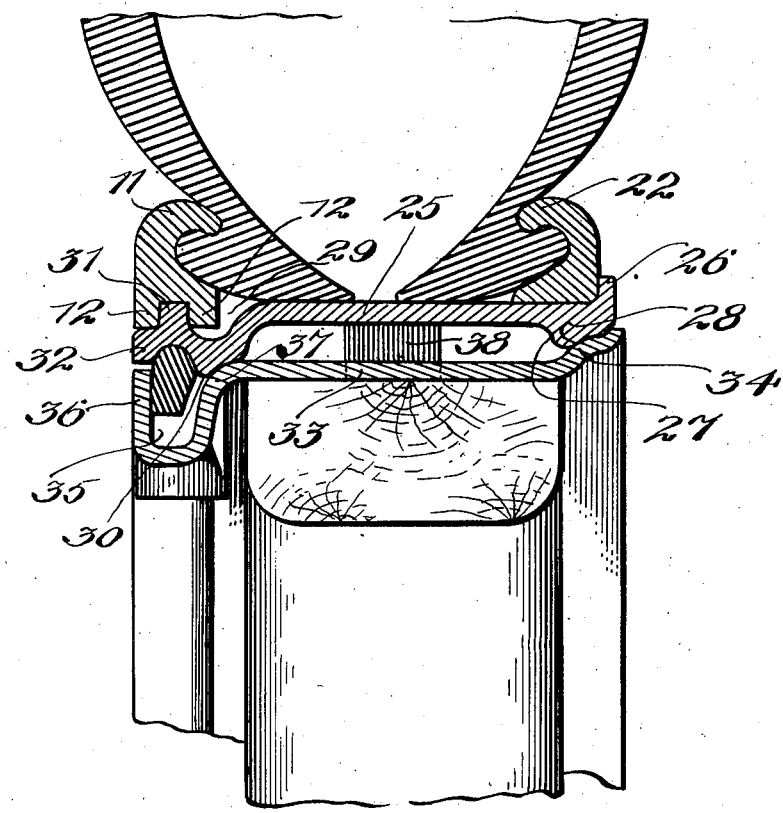

ROBERT W. ASHLEY AND FRANK OBERKIRCH, OF NEW YORK, N. Y., ASSIGNORS TO GENERAL RIM COMPANY, A CORPORATION OF NEW YORK.

DEMOUNTABLE RIM.

1,058,399.

Specification of Letters Patent.   Patented Apr. 8, 1913.

Application filed September 21, 1912.   Serial No. 721,707.

*To all whom it may concern:*

Be it known that we, ROBERT W. ASHLEY and FRANK OBERKIRCH, citizens of the United States, and residents of New York city, in the county of New York and State of New York, have invented certain new and useful Improvements in Demountable Rims, of which the following is a specification.

The invention relates to improvements in demountable rims and has particular reference to that type of rim utilized in connection with pneumatic tires for vehicle wheel purposes.

The object of the invention is the providing of a demountable rim having associated therewith means for reinforcing the base rim circumferentially, said base rim carrying tire retaining rings adapted to receive a pneumatic tire, said rings being so arranged with relation to said base rim as to reinforce the supporting features of said demountable rim, and a fixed annular rim for supporting said demountable rim.

In the following is described in connection with the accompanying drawings one embodiment of the invention, the features thereof being more particularly pointed out hereinafter in the claims.

In the drawings Figure 1 is a cross sectional view of the demountable rim, showing the relation of the same upon the fixed annular rim; Fig. 2 is a face elevation of one of the tire retaining rings, which is separable from the base member of said demountable rim; Fig. 3 is a sectional detail of the separable tire retaining ring, illustrating in connection therewith means for locking the split ends of said separable ring to one of the reinforcing channels on the base member of said demountable rim; Fig. 4 is an underview of the ends of said separable split ring, illustrating a modified form of locking the said ring in the reinforcing channel of said demountable rim; Fig. 5 is a detailed view, partly in section, of the split ends of said separable tire retaining ring; and, Fig. 6 is a cross sectional view of the preferred type of demountable rim, illustrating in connection therewith the preferred form of demountable rim, supporting base rim, or fixed felly rim.

Similar numerals of reference indicate similar parts throughout the several views.

In the drawings (1) indicates a felly, having mounted thereon a fixed annular rim
(2) provided at its front edge with an annular groove (3) and at its rear edge with
a retaining shoulder (4). Said groove (3)
has mounted therein a floating locking retaining ring (5), the object of which is to
provide means for holding demountable rim
(6) on said fixed rim (2). Said demountable rim (6) comprises a base rim (7) having formed on its rear edge a retaining shoulder (8) and adjacent thereto a depending channel (9), and on its front edge a
depending reinforcing channel (10) adapted
to receive separable tire retaining split ring
(11) which has formed on its inner surface
two depending flanges (12) forming between said respective flanges a groove (13)
adapted to span the outer wall (14) of
channel (10). By providing ring (11) with
two depending flanges (12) said ring (11)
is not only permanently supported in channel (10) on base rim (7) but the outer flange
(12) reinforces and strengthens the wall
(14) of channel (10). Ring (11) described
as being a split ring has formed in the split
ends an aperture (15) adapted to receive a
locking means (16) which comprises a steel
clip (17) having formed thereon pins (18)
and a laterally projecting base (19) which
projects beneath channel (10) and has
mounted therein a set screw (20) adapted
to engage the inside surface of channel (10)
and when permanently in place thereon lock
said clip (17) in ring (11) on base rim (7).
The wall (14) of channel (10) having cut
therein a slot (21) through which pins (18)
on clip (17) project, the aperture (15) on
ring (11) projects through both of the depending flanges (12) thereof permitting said
pins (18) to permanently lock the split ends
of ring (11) together, as well as upon the
base rim (7). Demountable rim (6) has
mounted on the rear end thereof and spanning channel (9) a tire retaining ring (22)
both of said rings (11 and 22) being reversible for divers types and forms of pneumatic shoes.

Referring to Fig. 4 of the drawings, the
split ring (11) is so split as to form an L
shaped locking surface (23). The alternate
ends of depending flanges (12) being cut
away as at (24) to permit of the easy removal of split ring (11) from base rim (7).

This type of structure also provides a means of obviating any possible corrosion or sticking of the ring (11) at its split ends, ring (22) described as spanning channel (9) also obviating the corrosion of that ring.

Referring to Fig. 6 of the drawings, the type of general structure shown therein comprises substantially the preferred type of demountable rim and annular fixed rim, as heretofore described. The base member (25) of said demountable rim has formed at its rear edge a retaining shoulder (26), and on the under surface immediately adjoining said shoulder a depending rib (27) provided with a tapered supporting surface (28). The forward edge of member (25) of the demountable rim has formed therein a depending channel (29) provided with an inner supporting surface (30), and at the edge of said channel (29) an upwardly projecting annular rib or wall (31), and at its extreme edge with an overlapping flange (32). (33) indicates the fixed rim which is provided at its rear edge with a supporting retaining shoulder (34), upon which the tapered supporting surface (28) of rib (27) rests, providing at that point a rocking surface for demountable rim (25), the front edge of fixed rim (33) having formed therein an annular groove (35) adapted to receive a suitable locking means for said demountable rim. The outer wall (36) of groove (35) projects upwardly and meets substantially the over-lapping flange (32) of rim (25), forming in this instance a housing for the demountable rim locking means. At the point where groove (35) is bent downwardly from the surface of fixed rim (33) a curved surface (37) is formed upon which the tapered supporting surface (30) of channel (29) rests, providing a wedge locking reception supporting surface, as well as a surface from which the demountable rim (25) may be readily rocked and demounted. The split ring (11) is provided with the depending flanges (12), which when mounted upon rim (25) span rib (31), thereby not only providing a secure means of holding ring (11) on said rim (25) but reinforcing said rim (25) at a point where the strength thereof is required. Channel (29) is of a greater depth than the length of flanges (12) on ring (11) thereby providing means obviating the corrosion of the ring (11) at that point upon rim (25), and furthermore, obviating, to a great extent, the sticking of the retaining shoulder on the pneumatic shoe. A tire retaining ring is also placed upon rim (25) both of said rings being reversible for divers types and forms of tires, as is hereinabove described. A suitable lug (38) is spot welded on the under surface of rim (25) and so arranged as to engage an aperture in fixed rim (33) for preventing the circumferential or creeping movement of said rim (25), or the demountable structure upon the fixed annular retaining rim.

It is obvious that the device herein shown and described may be varied in its structural features without departing from the spirit of the invention.

What we claim and desire to secure by Letters Patent of the United States is—

1. A device of the character described comprising a demountable base rim, a retaining shoulder at its rear edge, a supporting annular rib formed on the under surface of said base rim adjacent to said retaining shoulder, a depending channel formed in said base rim provided with a diagonally inclined supporting surface, an upwardly projecting annular rib formed on said base rim adjacent to said depending channel, a flange formed on said rim on the extreme outer edge thereof and adjacent to said annular upwardly projecting rib, a separable ring mounted on said base rim and engaging the supporting shoulder at the rear edge of said rim, and a split ring provided with two depending flanges spanning said annular upwardly projecting rib, one of said flanges engaging the periphery of the outer flange of said rim, the other of said flanges projecting into said depending channel.

2. A device of the character described comprising a demountable base rim, a retaining shoulder at the rear edge thereof, a supporting annular rib formed on the under surface of said base rim adjacent to said supporting shoulder, a depending channel formed in said base rim provided with a diagonally inclined supporting surface, an upwardly projecting annular rib formed on said base rim adjacent to said depending channel, an overlapping flange formed on said rim on the extreme outer edge thereof and adjacent to said annular upwardly projecting rib, a separable ring mounted on said base rim and engaging a supporting shoulder at the rear edge of said rim, a split ring provided with two depending flanges spanning said annular upwardly projecting rib, and means mounted in the split ends of said ring for locking said ends permanently on said base rim.

3. A device of the character described comprising a demountable base rim, a retaining shoulder formed thereon at the rear edge thereof, a reinforcing annular rib formed on the under surface of said base rim adjacent to said supporting shoulder provided on its under surface with a diagonally inclined base, a depending channel formed in said base rim on the opposite edge thereof provided on its under surface with a diagonally inclined supporting wall, an upwardly projecting annular rib formed on said base rim adjacent to said depending channel, an overlapping flange formed on said rim on the extreme outer edge thereof and adjacent to said annular upwardly projecting rib, a separable ring mounted on said base rim and engaging the supporting shoulder at the rear edge thereof, a split ring provided with depending flanges at its lower inner edges and a groove adapted to engage said annular upwardly projecting rib, and means mounted in said split ring engaging said upwardly projecting rib and the inner walls of said depending channel for locking said split ring to said base rim.

In testimony whereof we have hereto signed our names in the presence of two subscribing witnesses.

ROBERT W. ASHLEY.
FRANK OBERKIRCH.

Witnesses:
E. E. HAINES,
CHARLES C. LINK.